US006421443B1

(12) United States Patent
Moore et al.

(10) Patent No.: US 6,421,443 B1
(45) Date of Patent: *Jul. 16, 2002

(54) ACOUSTIC AND ELECTRONIC ECHO CANCELLATION

(75) Inventors: Kendall G. Moore, Tempe; Samuel L. Thomasson, Gilbert, both of AZ (US)

(73) Assignee: Acoustic Technologies, Inc., Mesa, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/360,211

(22) Filed: Jul. 23, 1999

(51) Int. Cl.$^{7}$ ................................................ H04M 1/00

(52) U.S. Cl. ............................ 379/406.01; 379/406.05; 379/390.01

(58) Field of Search ........................ 379/387.01, 388.01, 379/388.06, 390.01–390.02, 393, 406–407, 410–411, 416, 420; 370/290–291; 381/92, 94.1; 327/152–153, 161, 250, 269–270

(56) References Cited

U.S. PATENT DOCUMENTS

| | | | | |
|---|---|---|---|---|
| 3,903,377 A | | 9/1975 | Sato | 179/170.2 |
| 4,480,156 A | | 10/1984 | Takahashi et al. | 179/170.2 |
| 4,764,955 A | * | 8/1988 | Galand et al. | 379/411 |
| 4,829,491 A | | 5/1989 | Saugeon et al. | 367/103 |
| 4,903,241 A | | 2/1990 | Boudewijns | 365/194 |
| 5,453,710 A | | 9/1995 | Gilbert et al. | 327/277 |
| 5,521,599 A | | 5/1996 | McCarroll et al. | 341/122 |
| 5,657,384 A | * | 8/1997 | Staudacher et al. | 379/411 |
| 5,737,410 A | * | 4/1998 | Vähätalo et al. | 379/410 |
| 6,166,573 A | * | 12/2000 | Moore et al. | 327/161 |

* cited by examiner

*Primary Examiner*—Curtis Kuntz
*Assistant Examiner*—George Eng
(74) *Attorney, Agent, or Firm*—Paul F. Wille

(57) ABSTRACT

A transmitted signal is coupled through a coarse delay and a fine delay to one input of a correlator. Another input of the correlator is coupled to a received signal. The delays are adjusted for maximum correlation and the output of the fine delay is subtracted from the received signal to reduce or eliminate an echo. The delays operate by sampling the signal and storing the samples at successive storage sites. The storage sites are read a predetermined time later, producing the delay. The read operation for the coarse echo includes three readings from separate sites and using the correlation products to indicate the magnitude and direction for changing the delay.

11 Claims, 4 Drawing Sheets

ACOUSTIC AND ELECTRONIC ECHO CANCELLATION

CROSS-REFERENCE TO RELATED APPLICATION

This application contains common subject matter with application Ser. No. 09/361,014, filed on even date herewith, and assigned to the assignee of this invention. The contents of said application are incorporated by reference herein.

BACKGROUND OF THE INVENTION

This invention relates to echo cancellation in telephone systems and, in particular, to cancellation of acoustic and electronic echoes in telephone systems.

There are two kinds of echo in a telephone system, an acoustic echo between an earphone or a speaker and a microphone and electrical echo generated in the switched network for routing a call between stations. In a handset, acoustic echo is typically not much of a problem. In speaker phones, where several people huddle around a microphone and loudspeaker, acoustic feedback is much more of a problem. Hybrid circuits (two-wire to four-wire transformers) located at terminal exchanges or in remote subscriber stages of a fixed network are the principal sources of electrical echo.

The distance that a signal travels causes a minimum delay. Digital calling apparatus further delays a signal in the digitizing process and in the batch (packet) mode that signals are often handled. Using a satellite relay can add considerably to the delay; a minimum of 250 milliseconds each way.

An echo is perceived if a delay is greater than approximately twenty milliseconds. Digital packet transmission through a satellite can produce a delay in excess of 600 milliseconds. Modern network equipment is incapable of handling a delay longer than about 100 milliseconds. Acoustic delays, such as reverberations in a room, can be much longer, up to 1,500 milliseconds.

In the prior art, echo canceling apparatus operates by subtracting a delayed or reconstructed original signal, or a contrived signal, from a composite signal (original sound plus echo) present in the line. The echo canceling apparatus can be either digital or analog. If digital, echo paths having very long propagation delays can be accommodated.

In a constantly changing environment, such as a telephone system, both electronic delays and acoustic delays can change during a call. In the prior art, the settings for an echo canceling circuit are not changed during a call, largely due to a long convergence time in the circuitry for finding and canceling an echo. Changing settings during a call would cause noticeable distortion in the sound, somewhat like a magnetic tape recording when the tape is deformed.

The sampling rate of analog to digital (A/D) converters in telephone systems is typically 8,000 samples per second. This number was chosen because of the relatively narrow bandwidth of a telephone system, 300–3,400 Hz, and because of the speed limitations of digital signal processing (DSP) devices. At 8,000 samples per second, the samples are separated by 125 microseconds and a 3.4 kilohertz signal is sampled only 2.3 times per cycle. This is not particularly good resolution.

In order to increase resolution, one must increase the number of samples, which causes a corresponding increase in the number of storage sites. The number of storage sites is limited by the cost of manufacturing suitable integrated circuits and the complexity of addressing the sites in real time. It is desired to have echo canceling apparatus that is both effective and compact in order to fit with handsets, speaker phones, cellular telephones, and the like.

In an analog system, the signals are not converted to digital data, which simplifies the circuitry. However, the storage time for the samples is presently limited by the characteristics of the storage node to approximately one half second without some sort of refreshing. For longer storage times, A/D conversion and memory storage are necessary.

A large number of storage sites adversely affects the time for the system to lock onto the delay, referred to herein as convergence. In a constantly changing environment, such as a telephone, system delays can change during a call and acoustic delays can change during a call because a person moves about a room. In the prior art, the settings for an echo canceling circuit are not changed during a call, largely due to a long convergence time.

In view of the foregoing, it is therefore an object of the invention to provide improved apparatus for canceling acoustic echoes and electrical echoes in telephone apparatus.

Another object of the invention is to provide echo canceling apparatus that converges quickly on the echo.

A further object of the invention is to provide acoustic echo canceling apparatus capable of delaying a signal for one second or more.

Another object of the invention is to provide echo canceling apparatus that can match phase within less than one degree using relatively few delay elements.

A further object of the invention is to provide echo cancellation apparatus that can adjust to changes in echo during a telephone call.

SUMMARY OF THE INVENTION

The foregoing objects are achieved by this invention in which a transmitted signal is coupled through a coarse delay and a fine delay to one input of a correlator. Another input of the correlator is coupled to a received signal. The delays are adjusted for maximum correlation and the output of the fine delay is subtracted from the received signal to reduce or eliminate an echo. The delays operate by sampling the signal and storing the samples at successive storage sites. The storage sites are read a predetermined time later, producing the delay. The read operation for the coarse echo includes three readings from separate sites and using the correlation products to indicate the magnitude and direction for changing the delay.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
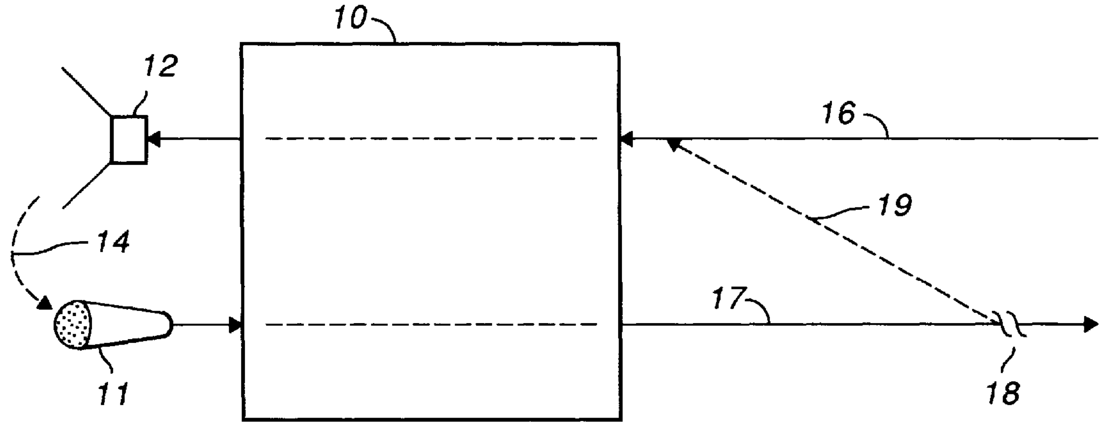
FIG. 1 illustrates acoustic echo and electrical echo in a telephone system.

In FIG. 1, block 10 represents a speaker phone including microphone 11 for converting sounds into electrical signals and loudspeaker 12 for converting electrical signals into sounds. As indicated by dashed arrow 14, some sound is coupled from loudspeaker 12 to microphone 11, creating an echo. If there were sufficient coupling between loud speaker 12 and microphone 11, the system would oscillate.

Speaker phone 10 is coupled to a telephone network, represented by lines 16 and 17. Discontinuity 18 causes a reflection, represented by dashed line 19, from output line 17 to input line 16 that is perceived as an echo. The invention can reduce or substantially eliminate both echoes illustrated in FIG. 1.

Figure 2:
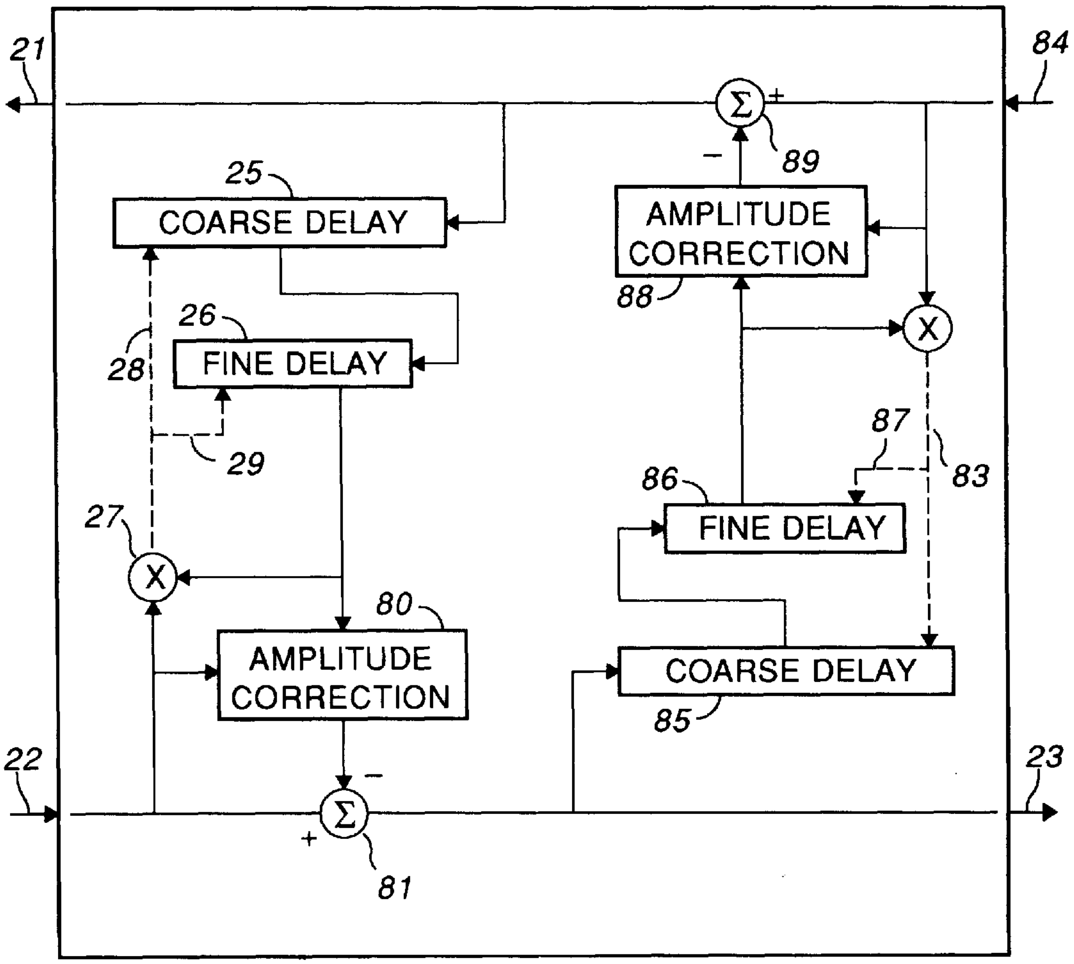
FIG. 2 is a diagram of a portion of a telephone including echo canceling circuitry constructed in accordance with the invention.

FIG. 2 is a block diagram of an echo canceling circuit constructed in accordance with the invention. The strongest signal coupled from output port 21 to input port 22 is perceived as an echo and is removed before the signal is coupled to a telephone network by output port 23. Specifically, coarse delay 25 and fine delay 26 combine to provide a high resolution measurement of the time required for an original sound to leave output port 21 and arrive at input port 22. The signal from fine delay 26 and the composite signal from input port 22 are compared in correlator 27. Coarse delay 25 is adjusted for maximum correlation, as indicated by dashed line 2. Fine delay 26 is then adjusted, as indicated by dashed line 29, to increase correlation even more.

There are several types of correlator that can be used for implementing the invention. The most complicated correlator is a full multiplier circuit. The simplest correlator is a gate for selectively passing or blocking a signal. A circuit of intermediate complexity is a binary phase shift modulator. This circuit reverses the polarity of a first signal in accordance with a second signal. The correlation product provides both magnitude and direction information for adjusting the amount of delay. For the digital delay devices in particular, adjusting the delay is simply changing an offset for a pointer to memory addresses.

Figure 3:
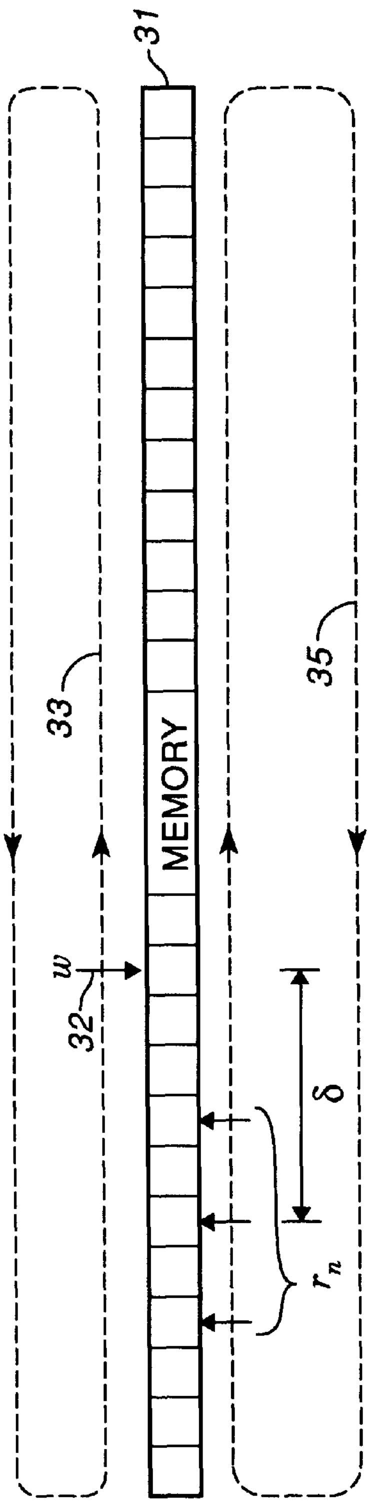
FIG. 3 schematically illustrates the operation of a system constructed in accordance with the invention.

The operation of coarse delay 25 is illustrated in FIG. 3. Memory 31, which can be analog or digital, includes a plurality of storage sites that are written by suitable means, represented by arrow 32. As indicated by dashed line 33, arrow 32 moves in the direction indicated to address memory 31 sequentially and repeatedly.

The data is read by suitable apparatus following arrow 32, thereby introducing a delay into the signal from memory 31. The delay can be considerable, in excess of 500 milliseconds. Sampled at 8,000 samples per second with 12-bit resolution, memory 31 need only store 48,000 bits of data (48,000 storage sites, preferably addressed as words containing several bits) for one half second of data. Such memory is readily available and can easily fit into a cellular telephone, for example. In analog form, only 4,000 storage sites are needed for memory 31.

The number of storage sites between the write pointer and the read pointer is directly proportional to delay, represented as delta ($\delta$) in FIG. 3. In accordance with the invention, three storage sites are read simultaneously. The three sites need not be consecutive but the second site is preferably midway between the first site and the third site.

Figure 4:
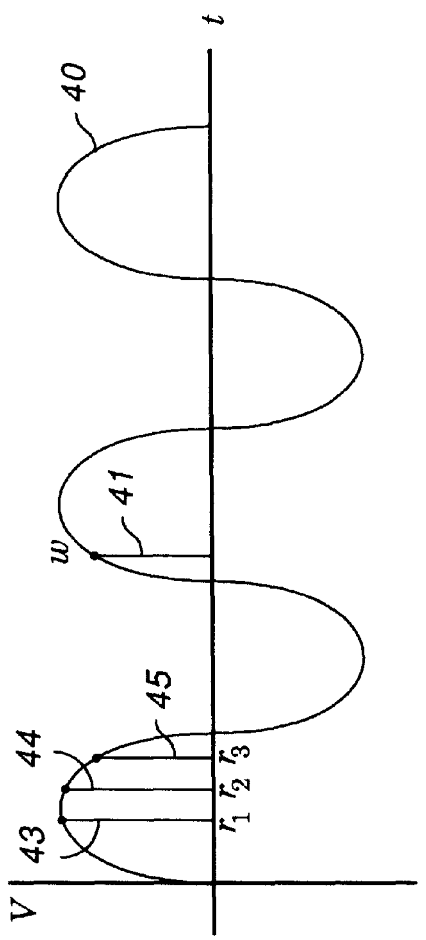
FIG. 4 illustrates the operation of the invention upon a sinusoidal signal.

The read operation is best understood by considering FIG. 4. Signal 40, which can have any waveform, is sampled and written to memory at a time indicated by pointer 41. The signal is later read at times indicated by pointers 43, 44, and 45. The three signals are correlated with the signal from input port 22 (FIG. 2) to produce correlation products that indicate in which direction to adjust the delay. If, for example, the signal from pointer 43 has the highest correlation, then the delay is increased (greater separation from write pointer 41) until the highest correlation is obtained at pointer 44.

Correlation should not be confused with the amplitude of the signal. The delayed signal is being read as the pointers move from left to right, as indicated by dashed line 35 in FIG. 3 and correlation may take place over several cycles of the signal from input port 22 (FIG. 2). In fact, with a coarse delay and a fine delay, convergence takes place in fifty milliseconds or less (within one hundred seventy cycles of a 3,400 Hz signal). Systems of the prior art converge in 500–3,000 milliseconds.

Figure 5:
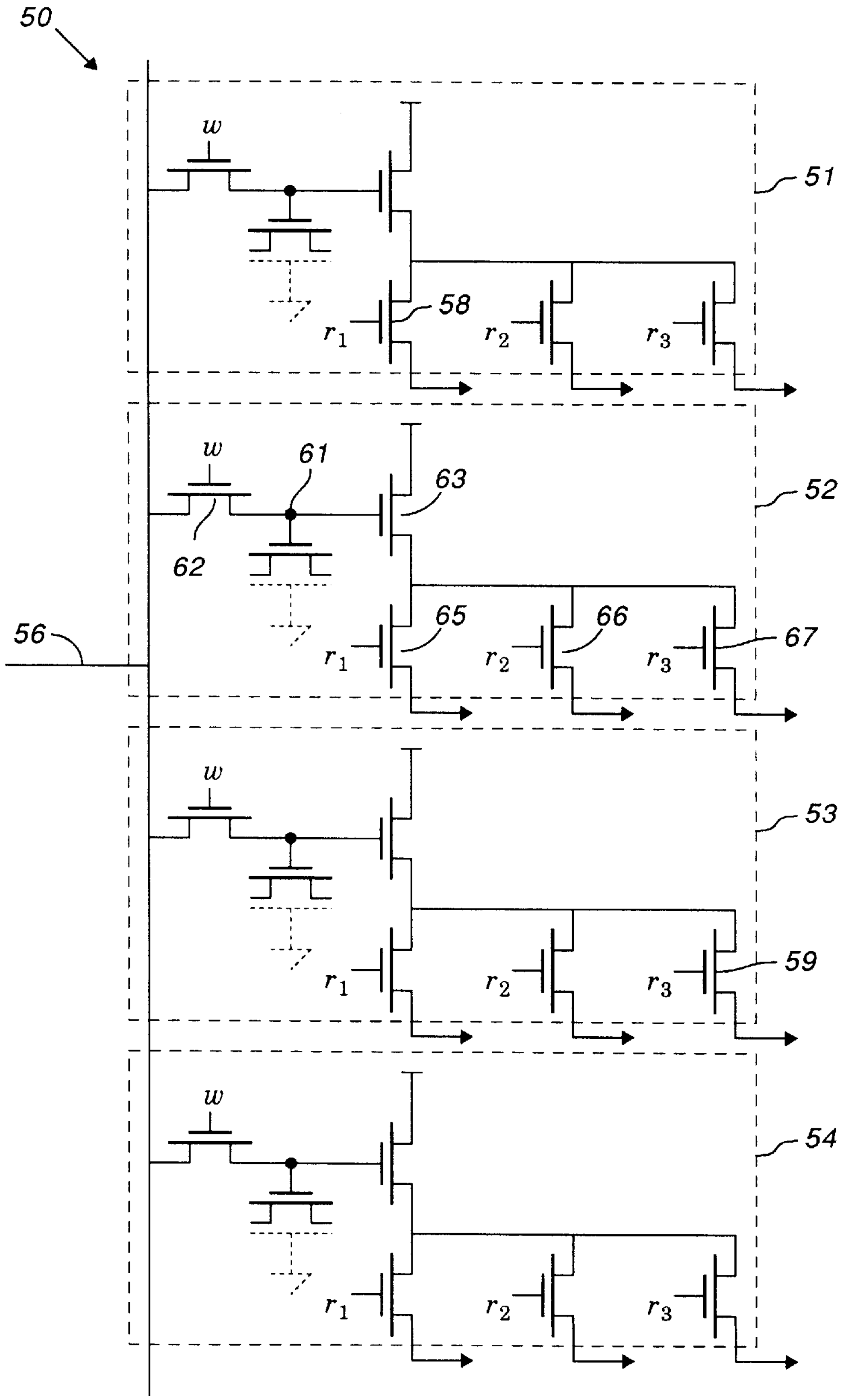
FIG. 5 is a schematic of an analog delay line constructed in accordance with the invention.
Figure 6:
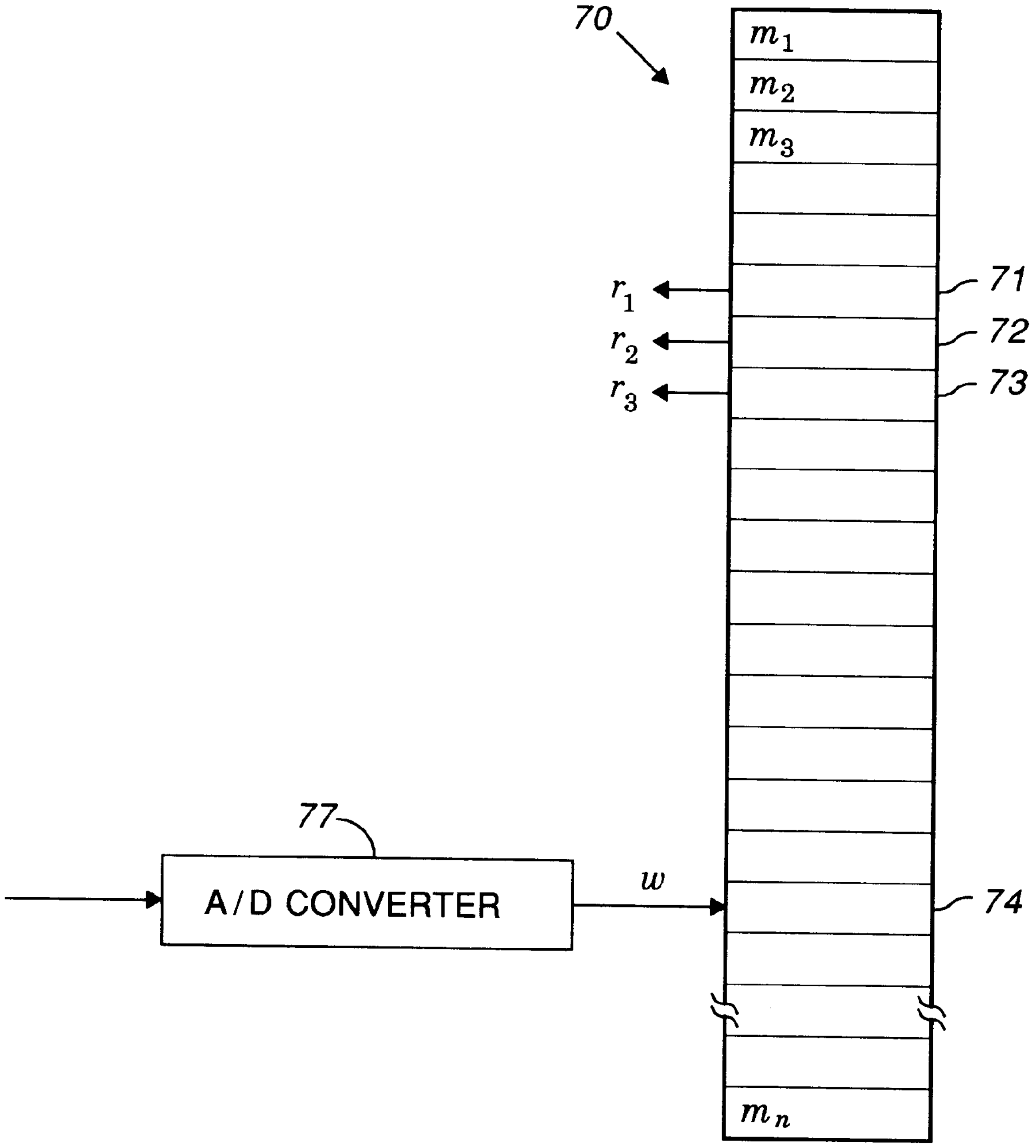
FIG. 6 is a block diagram of a digital delay line constructed in accordance with the invention.

FIG. 5 illustrates an analog implementation of delay line 31 (FIG. 3). Memory 50 includes a plurality of substantially identical storage sites, such as sites 51, 52, 53, and 54, connected in parallel to input 56. Input 56 corresponds to input port 22 (FIG. 2) or may be coupled to input port 22 by intermediate buffers, filters, and the like.

Storage site 52 includes storage node 61 coupled to input 56 by write gate 62. Storage node 61 is preferably the gate of an isolated FET (field effect transistor) that exhibits a capacitance relative to ground or common. The amplitude of the input signal is stored on node 61 during the moment that gate 62 is open. Node 61 is coupled through source follower 63 to read gates 65, 66, and 67. These read gates are never open simultaneously, although read gates 58, 66, and 59 may be open simultaneously.

A preferred embodiment of the invention includes differential voltages for improved performance. Thus, there are actually twice as many storage sites, one half for the signal and one half for the inverted signal. In a read operation, the difference in voltage between node 61 and the corresponding opposite node is read.

FIG. 7 illustrates a digital implementation of delay line 25 (FIG. 2). Memory 70 includes a plurality of storage sites, such as sites 71, 72, 73, and 74. Each site has a unique address and includes a plurality of bits, as determined by the construction of the particular integrated circuit. Preferably, each "word" or group of bits corresponds to the resolution of the A/D converter used for writing data, e.g. twelve bits. The data is preferably stored in sequential addresses but need not be.

A/D converter 77 is coupled to input port 22 (FIG. 2) by buffers, filters, and the like. An input signal is sampled and the amplitude of the sample is converted into a digital number that is stored in memory 70, e.g. at site 74. Data is read in the same order in which it was stored. As with the analog version, the number of sites between the read pointer and the write pointer determines the delay. The actual amount of delay, in seconds, depends also upon the clock rate.

Fine delay 26 (FIG. 2) is constructed and operated in the same manner as coarse delay 25, with two exceptions. The sample rate is much higher, 100 kHz to 1 MHz or more, and there is only one read line, not three. In one embodiment of the invention, the fine delay is scanned from end to end while monitoring the correlation coefficient for maximum correlation. Alternatively, one can use successive approximation, where the fine delay is preset to midrange and then increased or decreased to obtain maximum correlation.

The output from fine delay 26 is coupled through amplitude correction circuit 80 to an inverting input of summing circuit 81. Amplitude correction circuit 80 adjusts the amplitude of the artificially delayed signal to match that at port 22. Port 22 is coupled to a non-inverting input of summing circuit 81, wherein the delayed signal is subtracted from the composite signal from port 22, thereby reducing or eliminating the acoustic echo. Amplitude correction circuit can include an amplitude correlation loop, as described in co-pending application Ser. No. 09/326,008, filed Jun. 18, 1999, and assigned to the assignee of this invention, or other means for adjusting amplitude.

In one embodiment of the invention, coarse delay 25 operated at 8,000 Hz. and stored 4,000 samples (500 millisecond maximum delay). Fine delay 26 operated at 800,000 Hz and stored 400 samples (0.5 millisecond maximum delay). Note how little additional storage is required to provide the fine delay. Note too that the minimum coarse delay, 0.125 milliseconds, is less than the total fine delay. Thus, in this example, the fine delay can divide each coarse delay period into one hundred smaller periods, with overlap at each end to ensure continuity. The total fine delay is preferably equal to or greater than one half the minimum coarse delay.

Other combinations of sample rates can provide a wide range of delays and resolutions and, most importantly, can provide delays as long as 1.5 seconds or more at a resolution of tens of microseconds or less. This enables one to match phases to within less than one degree at 3,400 Hz. Further, one can combine digital coarse delay with an analog fine delay to provide a relatively easily implemented, inexpensive, yet precise system.

Correlator 83 receives the signal from the switched network on input port 84 and compares that signal with the signal artificially delayed by coarse delay 85 and fine delay 86. Coarse delay 85 is constructed in the same manner as coarse delay 25 and fine delay 86 is constructed in the same manner as fine delay 26. The amplitude of the phase matched signal is then adjusted in amplitude correction circuit 88. Electronic echoes are removed from the composite signal on input port 84 by summing circuit 89.

The invention thus provides an improved apparatus for canceling acoustic echoes and electrical echoes in telephone apparatus. The circuit converges quickly to provide echo cancellation apparatus that converges quickly on the echo despite being able to resolve a delay of less than one degree at 3,400 kHz. The echo canceling apparatus of this invention is capable of delaying a signal for one second or more and can adjust to changes in echo during a telephone call.

Having thus described the invention, it will be apparent to those of skill in the art that various modifications can be made within the scope of the invention. For example, the composite signal can be broken into bands and each band treated as shown in FIG. 2. The echo can be a replica of any original sound, not just speech.

What is claimed as the invention is:

1. A method for reducing the echo of a signal leaving an output port and arriving at an input port of a telephone, said method comprising the steps of:

passing the signal through a coarse delay to produce a delayed signal;

passing the delayed signal through a fine delay to produce an artificially delayed signal;

correlating the artificially delayed signal with the signal arriving at the input port;

adjusting the coarse delay for maximum correlation; and then adjusting the fine delay for maximum correlation.

2. The method as set forth in claim 1 and further including the step of:

subtracting the artificially delayed signal from the signal received at the input port.

3. The method as set forth in claim 1 wherein said step of passing said signal through a coarse delay includes the steps of:

sampling the signal and storing the samples in memory; and reading the stored samples after writing.

4. The method as set forth in claim 3 wherein said reading step includes the steps of:

reading the samples from three locations in memory;

correlating the samples with the signal arriving at the input port to produce correlation products;

adjusting the coarse delay in a direction indicated by the correlation products.

5. The method as set forth in claim 1 wherein said step of adjusting the fine delay includes the step of sweeping the fine delay from minimum to maximum.

6. The method as set forth in claim 1 wherein said step of adjusting the fine delay includes the step of sweeping the fine delay from maximum to minimum.

7. The method as set forth in claim 1 wherein said step of adjusting the fine delay includes the step of scanning the fine delay by successive approximations.

8. Apparatus for reducing echo in a telephone, said apparatus comprising:

a first output port for coupling electrical signals to a speaker;

a first input port for receiving electrical signals from a microphone;

a second output port for coupling signals to a telephone network;

a second input port for receiving signals from a telephone network;

a first coarse delay device coupled to said first output port;

a first fine delay device coupled to said first coarse delay device;

a first correlator having an input coupled to said first input port and a second input coupled to said first fine delay device, said correlator adjusting the first coarse delay for maximum correlation and adjusting the first fine delay for maximum correlation.

9. The apparatus as set forth in claim 8 and further including a summing circuit having an inverting input coupled to said fine delay device and a non-inverting input coupled to said first input port.

10. The apparatus as set forth in claim 8 and further including:

a second coarse delay device coupled to said second output port;

a second fine delay device coupled to said second coarse delay device;

a second correlator having an input coupled to said second input port and a second input coupled to said second fine delay device, said correlator adjusting the second coarse delay for maximum correlation and adjusting the second fine delay for maximum correlation.

11. The apparatus as set forth in claim 10 and further including:

a first summing circuit having an inverting input coupled to said first fine delay device and a non-inverting input coupled to said first input port; and a second summing circuit having an inverting input coupled to said second fine delay device and a non-inverting input coupled to said second input port.

* * * * *